United States Patent [19]
Findlan et al.

[11] Patent Number: 5,656,185
[45] Date of Patent: *Aug. 12, 1997

[54] METHOD AND APPARATUS FOR REPAIRING DAMAGED TUBES BY INTERIOR LASER CLAD WELDING

[75] Inventors: Shane J. Findlan, Harrisburg, N.C.; Wylie J. Childs, Belmont, Calif.

[73] Assignee: Electric Power Research Institute, Palo Alto, Calif.

[*] Notice: The term of this patent shall not extend beyond the expiration date of Pat. No. 5,430,270.

[21] Appl. No.: 440,551

[22] Filed: May 12, 1995

Related U.S. Application Data

[62] Division of Ser. No. 18,644, Feb. 17, 1993, Pat. No. 5,430,270.

[51] Int. Cl.$^6$ ................................. B23K 26/00
[52] U.S. Cl. ................. 219/121.64; 219/121.63
[58] Field of Search .............. 219/121.63, 212.64; 376/260

[56] References Cited

U.S. PATENT DOCUMENTS

| | | | |
|---|---|---|---|
| Re. 29,815 | 10/1978 | Gnanamuthu | 219/121 |
| 3,265,584 | 8/1966 | Cooper. | |
| 3,310,423 | 3/1967 | Ingham et al.. | |
| 3,463,591 | 8/1969 | Franket et al.. | |
| 3,762,938 | 10/1973 | Ridemoor. | |
| 3,772,496 | 11/1973 | Harendza-Harinxma. | |
| 3,943,324 | 3/1976 | Haggerty. | |
| 3,947,653 | 3/1976 | Fairbairn. | |
| 4,001,543 | 1/1977 | Bove et al.. | |
| 4,017,708 | 4/1977 | Engel et al. | 148/565 |
| 4,029,932 | 6/1977 | Cook. | |
| 4,072,147 | 2/1978 | Hett. | |
| 4,117,302 | 9/1978 | Earle et al.. | |
| 4,122,240 | 10/1978 | Banas et al.. | |
| 4,157,923 | 6/1979 | Yen et al.. | |

(List continued on next page.)

FOREIGN PATENT DOCUMENTS

| | | | |
|---|---|---|---|
| 58-179587 | 10/1983 | Japan | 219/121.64 |
| 60-199587 | 10/1985 | Japan | 219/121.64 |
| 1-92381 | 4/1989 | Japan | 219/121.64 |
| 1-157786 | 6/1989 | Japan | 219/121.64 |

OTHER PUBLICATIONS

J. Lasalle and P. Platz, "A Compact, Concave Grating, Two Detector, Spectrum Analyzer for the Measurement of Electron Temperatures in CTR Plasmas by Ruby Laser Scattering", *Optics Communications*, vol. 17, No. 3, Jun. 1976, 325–7.

Breinan, et al, "Processing Materials With Lasers", *Physics Today*, Nov., 1976, pp. 44–50.

(List continued on next page.)

*Primary Examiner*—Geoffrey S. Evans
*Attorney, Agent, or Firm*—Flehr, Hohbach, Test, Albritton & Herbert

[57] ABSTRACT

A laser beam welding technique which can be utilized to accomplish clad welding and repair of the internal surface of a tube. The technique uses the addition of filler metal to build up the internal surface of the tube. The apparatus includes a laser energy source connected to an elongated weld head by an optical fiber. The elongated weld head is rotatable and contains a mirror canted at a forty-five (45) degree angle. The laser beam generated by the laser source enters the weld head through a rotary joint, passes through focusing lenses, and is reflected to the interior surface of the damaged tube by the canted mirror. Apparatus rotates the weld head which causes the beam to travel circumferentially around the interior of the tube. Metal fill material is fed to the location where the focused beam contacts the interior surface of the tube. The result is a smooth clad welding repair on the inside surface of the tube which restores the strength of the tube and leaves no crevices for future corrosion attack. In addition, the internal diameter of the tube is very close to the original diameter of the tube thus obviating pressure drop associated with the sleeving type repair and allowing for subsequent repair of the tube at positions beyond the first area of repair.

11 Claims, 5 Drawing Sheets

U.S. PATENT DOCUMENTS

| | | | |
|---|---|---|---|
| 4,178,512 | 12/1979 | Füngel et al. . | |
| 4,191,475 | 3/1980 | Sourrouille . | |
| 4,207,874 | 6/1980 | Choy . | |
| 4,212,900 | 7/1980 | Serlin . | |
| 4,218,494 | 8/1980 | Belmondo et al. . | |
| 4,242,981 | 1/1981 | Bernard et al. . | |
| 4,300,474 | 11/1981 | Livsey . | |
| 4,323,756 | 4/1982 | Brown et al. | 219/121 |
| 4,365,136 | 12/1982 | Gottlieb . | |
| 4,440,496 | 4/1984 | Milana . | |
| 4,495,255 | 1/1985 | Draper et al. . | |
| 4,537,793 | 8/1985 | Kehrer et al. . | |
| 4,543,270 | 9/1985 | Oprysko et al. . | |
| 4,737,011 | 4/1988 | Iri et al. . | |
| 4,743,733 | 5/1988 | Mehta et al. | 219/121 |
| 4,746,540 | 5/1988 | Kawasaki et al. . | |
| 5,066,846 | 11/1991 | Pirl | 219/121.63 |
| 5,097,110 | 3/1992 | Hamada et al. | 219/121.63 |
| 5,140,289 | 8/1992 | Andrieu et al. . | |
| 5,151,962 | 9/1992 | Walker et al. . | |
| 5,157,745 | 10/1992 | Ames . | |
| 5,170,452 | 12/1992 | Ott . | |
| 5,177,808 | 1/1993 | Satake et al. . | |
| 5,271,076 | 12/1993 | Ames . | |
| 5,315,684 | 5/1994 | Szegda . | |
| 5,359,172 | 10/1994 | Kozak et al. | 219/121.64 |
| 5,371,767 | 12/1994 | Pirl . | |
| 5,446,256 | 8/1995 | Cartry | 219/121.63 |

OTHER PUBLICATIONS

Translation of Japanese Laid Open Application of 1–62290 published Mar. 1989.

D–80MHL Optical Coupler Torque Relief Product, Mitsubishi Corp., Date Unknown.

METHOD AND APPARATUS FOR REPAIRING DAMAGED TUBES BY INTERIOR LASER CLAD WELDING

This is a division of application Ser. No. 08/018,644, filed Feb. 17, 1992, now U.S. Pat. No. 5,430,270.

BACKGROUND OF THE INVENTION

1. Field of the Invention

This invention relates to the repair of heat exchanger tubes and, more particularly, to the laser weld repair of steam generator tubes in a pressurized water reactor (PWR) nuclear power plant.

2. Description of Related Art

In nuclear power plants utilizing the pressurized water reactor cycle, heat is released in the reactor from the fission of nuclear fuel. The heat is removed from the reactor by continuously circulating fluid called reactor coolant. After being heated in the reactor, the coolant flows to a heat exchanger, commonly referred to as the steam generator, where it gives up heat and then returns to the reactor for further heating. In the steam generator, the nuclear reactor coolant heats a secondary water which is then used to drive a steam turbine. After exhausting from the steam turbine, the steam is condensed and returned to the steam generator for further heating by the reactor coolant. The reactor-steam generator coolant loop is normally referred to as the primary loop and the steam generator-turbine loop is usually referred to as the secondary loop.

The steam generator is typically a shell and tube type heat exchanger with the primary coolant passing through the inside of the heat exchanger tubes and the secondary water passing over the outside surface of the tubes and contained by the shell of the heat exchanger. Heat transfer from the reactor coolant to the secondary water occurs over most of the length of the tubes. To effect a seal at the end of the tubes, and thus prevent mixing of the reactor coolant and the secondary water, the ends of the tubes are connected to a tube sheet comprising a flat plate with apertures therethrough for receiving the ends of the tubes. The ends of the tubes are either seal welded to the tube sheet or expanded in the apertures to effect a sealed joint. The peripheral edges of the tube sheet are sealed to the shell of the steam generator and to a reactor coolant water box.

Steam generators are usually oriented such that the tubes generally run in a vertical direction and can be of the straight through or return flow type. In the straight through type steam generator, the tubes are straight and connected to tube sheets at both ends. The reactor coolant enters a water box at the top of the steam generator, flows through the tubes and is collected in a water box at the bottom of the steam generator. More common is the return flow type steam generator in which the tubes are an inverted "U" shape having both ends connected to the same tube sheet at the bottom of the steam generator. The water box below the tube sheet contains a division plate oriented to effectively seal that portion of the tube sheet containing tube inlets from that portion containing outlets. In this manner, reactor coolant flows into the inlet portion of the water box, through the inverted "U" tubes and into the output portion of the water box. In either the straight through or return type steam generator, the tubes are very long and require support along their length. This is accomplished by positioning support plates within the shell of the heat exchanger at various positions along the length of the tubes. The support plates contain apertures through which the tubes pass and have their peripheral edges connected to the shell of the steam generator.

To facilitate installation of the tubes and to allow for differential thermal expansion between the tubes and the shell, the apertures in the support plates are oversized to allow sliding of the tube relative to the support plate. However, the apertures in the plate must be small enough to provide adequate horizontal support for the tubes and to prevent excessive tube vibration during operation. Thus crevices are formed between the support plates and the tubes. These crevices collect debris and corrosion products during operation of the steam generator thereby promoting crevice corrosion. In addition, the joints between the tubes and the tube sheet previously described contain crevices which lead to crevice corrosion.

Steam generator tubes are susceptible to several types of corrosion mechanisms that can ultimately lead to leakage or significant wall thinning. These include primary water stress corrosion cracking, secondary side intergranular attack, secondary intergranular stress corrosion cracking and secondary side wastage. Primary side degradation typically occurs at locations of high tensile residual stress such as expansion transition areas, inner row U-bends, and tube support locations. Secondary side degradation occurs at locations where impurities can concentrate, providing corrosion sides, such as tube-to-tube sheet crevices, tube support plate-to-tube interfaces, anti-vibration bars interfaces, and sludge pile regions. Current mitigation techniques for these corrosion-induced problems include:

Steam generator replacement

Plugging degraded tubes

Electroplating tube interior surfaces

Sleeving degraded tubes

Steam generator replacement is a drastic solution involving substantial capital investment and months or years of plant down time with the attendant loss of revenue accompanying extended plant outages.

Plugging of the degraded tubes takes the tube out of service, reducing the steam generator efficiency. The ability to plug tubes is based on the "plugging margin" that is calculated based on operating experience for each steam generator. Once the "plugging margin" has been expended, further plugging of tubes reduces the capacity of the steam generator and the entire plant must be de-rated, operated at a capacity less than design.

Electroplating the steam generator tubes with nickel allows the tube to remain in service. Furthermore, nickel plating will seal small leaks and prevent further degradation, but does not restore the structural integrity of the tube. Therefore, a major limitation of electroplating is that it is effective only on small cracks that are detected early so that repair can be accomplished before the strength of the tube is seriously degraded.

Sleeving is a more expensive mitigation technique, but allows the tube to remain in service. Sleeving is accomplished by inserting in the damaged portion of the steam generator tube a short, tubular sleeve having an external diameter slightly less than the internal diameter of the steam generator tube and welding the sleeve to the tube. The sleeve is generally made of the same material as the tube and, in effect, replaces the damaged section of tubing. Therefore the structural integrity of the tube is restored by this method of repair. Sleeving is generally performed when the steam generator "plugging margin" is approached.

One approach to sleeving is disclosed in U.S. Pat. No. 5,066,846 issued Nov. 19, 1991 to William E. Pirl and incorporated by reference herein. In that patent, the sleeve is welded to the tube using a laser beam welding head positioned inside the tube. Laser energy from a laser source is directed through a fiber optic cable to the welding head where a canted mirror reflects the beam onto the interior surface of the sleeve. The weld head rotates in one axial position along the tube near one end of the sleeve and the laser beam delivers sufficient heat to fuse the sleeve to the tube in a narrow, circumferential band around the sleeve/ tube interface. The weld accomplished by this method is what is commonly referred to in the art as an autogenous weld in that the base metal of the sleeve and tube are melted and fused and no additional filler metal is added during the welded process. The weld head is then repositioned at the other end of the sleeve and another autogenous weld is accomplished.

Although sleeving in this manner can restore the structural integrity of the tube, it has a number of disadvantages. First, the sleeve necessarily decreases the internal diameter of the tube passage adding increased pressure drop to the flow of coolant through the tube when the steam generator is placed in service. Also, if the repair is located in the lower portion of a tube, such as at the tube sheet, subsequent repair of tube degradation above the location of the first sleeve is prevented because another sleeve of the correct dimensions cannot be inserted past the already installed sleeve. Second, the autogenous welds at both ends of the sleeve are usually recessed from the end of the tube because it is very difficult to accomplish a quality fillet weld on the end of the sleeve without adding filler metal. Because these welds are recessed from the ends of the sleeves, a crevice remains between the sleeve and the tube in the region between the end of the sleeve and the weld. Also because the welds themselves are narrow, circumferential bands, the external area of the sleeve between the bands forms a crevice with the tube. The damage to the tube which necessitated the repair, such as a crack or a pin hole, allows entrance of water into this crevice. These crevice areas are again susceptible to many forms of corrosion when the steam generator is placed back in service.

Attempts have been made to use a continuous, autogenous weld inside the tube, without the use of a sleeve, in order to repair damaged tubes. These efforts have failed because the corrosion which led to the damage leaves oxidized surfaces which result in flaws and voids when autogenous welding is used. If filler material is used in the welding process, the filler material can contain deoxidizing and viscosity control agents which prevent the flaws and voids associated with autogenous welding.

Thus, it is apparent that improved mitigation techniques are needed to meet the future demands of the PWR power plants. Once the tube plugging margin has been used and a large quantity of sleeves (i.e. >10% of the tubes) have been installed to permit continued operation, tube degradation eventually leads to a decision to replace the steam generator, de-rate the plant, or decommission the facility. Alternative repair technology is needed that can provide extended tube service to the end of plant life, at an economical cost.

SUMMARY OF THE INVENTION WITH OBJECTS

It is one object of the present invention to provide a simple and easy method to repair damaged tubes.

It is another object of the present invention to provide a method and apparatus for repair of steam generator tubes without requiring significant disassembly of the steam generator.

It is another object of the present invention to provide a method for repairing crevice corrosion cracking of steam generator tubes.

It is another object of the present invention to provide a method of clad welding the interior of small diameter tubes.

It is another object of the present invention to minimize the requirement of plugging steam generator tubes and the attendant loss in steam generator capacity.

It is another object of the present invention to extend the life of existing steam generators by periodically repairing damaged tubes.

It is another object of the present invention to provide a method and apparatus to accomplish multiple repairs to the same steam generator tube.

It is another object of the present invention to provide a method and apparatus to introduce deoxidizing and viscosity control agents in clad welding for the interior surface of steam generator tubes.

It is yet another object of the present invention to effect a repair of a leaking steam generator tube without increasing the susceptibility of the repaired area to subsequent crevice corrosion.

These and other objects are accomplished with a laser beam welding technique which can be utilized to accomplish clad welding and repair of the internal surface of a tube. The technique uses the addition of filler metal to build up the internal surface of the tube. The apparatus includes a laser energy source connected to an elongated weld head by an optical fiber. The elongated weld head is rotatable and contains a mirror canted at a forty-five (45) degree angle. The optical fiber is connected by a rotary joint to the bottom of the elongated weld head so that the axis of the optical fiber is aligned with the axis of the elongated weld head. The laser beam generated by the laser source enters the weld head through the rotary joint, passes through focusing lenses, and is reflected to the interior surface of the damaged tube by the canted mirror. Means are provided to rotate the weld head which causes the beam to travel circumferentially around the interior of the tube. Means are also provided to feed metal fill material to the location where the focused beam contacts the interior surface of the tube. In one embodiment, a coil of metal filler wire is pre-positioned near the damaged area of the tube. Means incorporated on the weld head grasp the end of the pre-positioned filler wire and continuously feed it to the point of laser beam contact with the tube. In another embodiment, a thin sheet of filler metal is positioned inside the tube over the area of damage and the laser beam coalesces and fuses both the filler metal an the base metal of the tube. In a third embodiment, filler metal wire is prepositioned in the form of a coil over the area to be clad welded. The result is a smooth clad welding repair on the inside surface of the tube which restores the strength of the tube and leaves no crevices for future corrosion attack. In addition, the internal diameter of the tube is very close to the original diameter of the tube thus minimizing pressure drop associated with the sleeving type repair and allowing the subsequent repair of the tube at positions beyond the first area of repair.

DETAILED DESCRIPTION OF THE PREFERRED EMBODIMENTS

The present invention is applicable to the repair of corroded or damaged small diameter tubes used in any application such as heat exchangers or material transport systems. The following detailed description of the apparatus and operation of the present invention uses by way of example a specialized heat exchanger known as a steam generator which is used in a pressurized water reactor nuclear power plant cycle.

Figure 1:
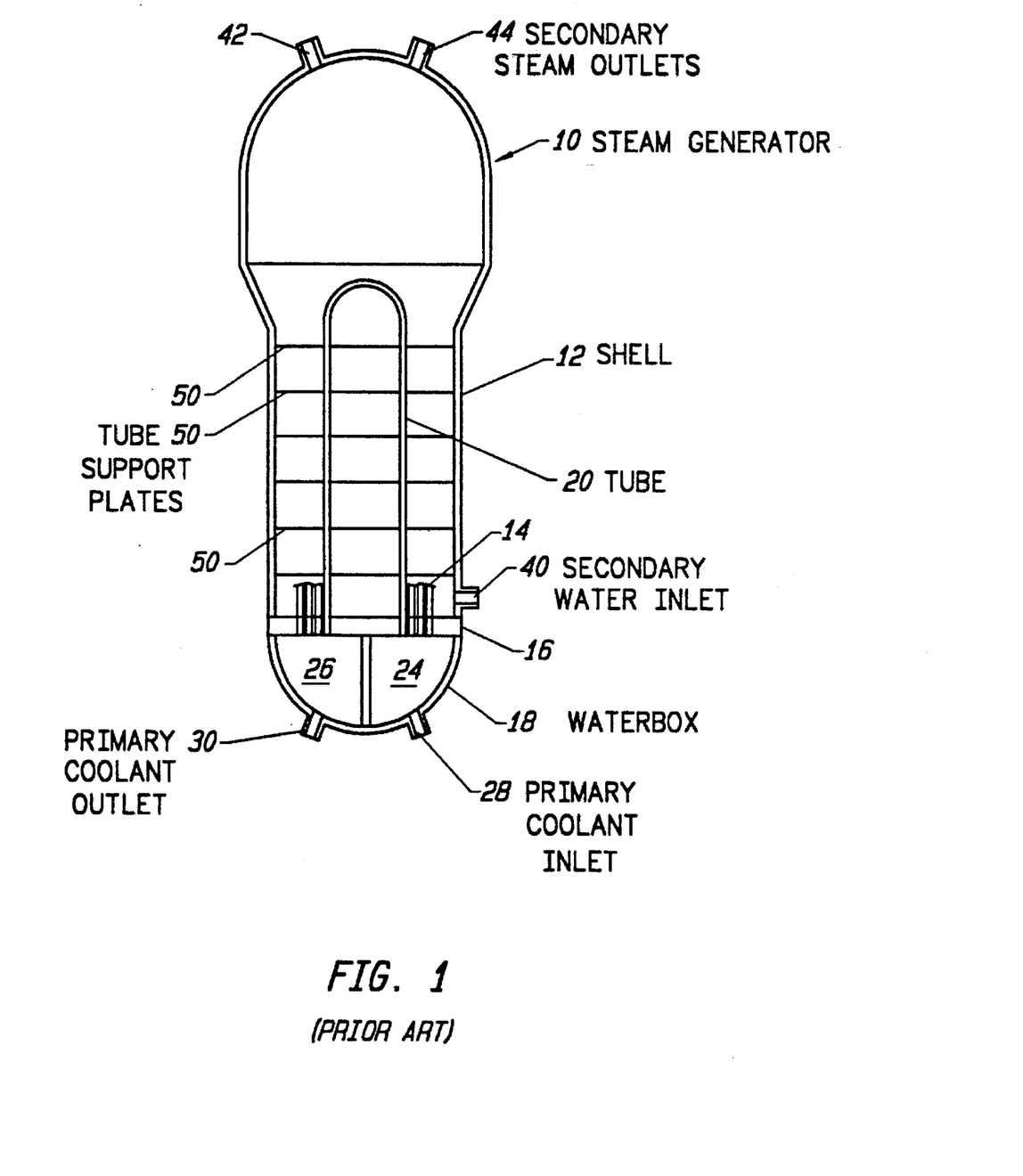
FIG. 1 is a sectional elevation view of a typical steam generator used in a pressurized water reactor power plant.

Turning now to FIG. 1, wherein like numerals designate like components throughout all of the several figures, a typical steam generator of the return type is depicted. The steam generator, generally designated as 10 consists of a shell 12, a tube nest 14, a tube sheet 16 and a water box 18. For clarity in the illustration, only one "U" shaped tube 20 is depicted but it is understood that tube bundle 14 is made up of thousands of individual tubes 20. Division plate 22 divides water box 18 into a first inlet section 24 and an outlet section 26. In operation, hot reactor coolant enters inlet section 24 or water box 18 through nozzle 28. From the inlet section 24, the coolant flows through tubes 20 to the outlet section 26 of the water box and back to the reactor (not shown) through nozzle 30. Secondary water enters the shell 12 through nozzle 40 and is heated by contact with tubes 20. As the secondary water is heated, it boils generating steam which exits the shell 12 at the top of the steam generator 10 through nozzles 42,44. The steam thus generated is routed to a steam turbine (not shown) where it is expanded to drive an electrical generator (not shown).

In the steam generator, the tubes 20 are connected to tube sheet 16 by seal welding or by expanding the tube within the tube aperture in the tube sheet 16. Located at various heights in the sheet 12 are tube support plates 50 containing apertures therethrough for passage of tubes 20. The apertures in tube support plates 50 are slightly larger in diameter than the outside diameter of tubes 20 so that the tubes can slide vertically within the support plates. This relative sliding capability is necessary to accommodate differential thermal expansion which occurs when the steam generator 10 is brought on line and slowly heated to operating temperature. As previously noted, the crevices formed between the support plates 50 and the tubes 20 as well as the crevices located at the attachment of tubes 20 to tube sheet 16 are susceptible to corrosion which degrades the tubes 20 ultimately leading to tube rupture or failure.

Figure 2:
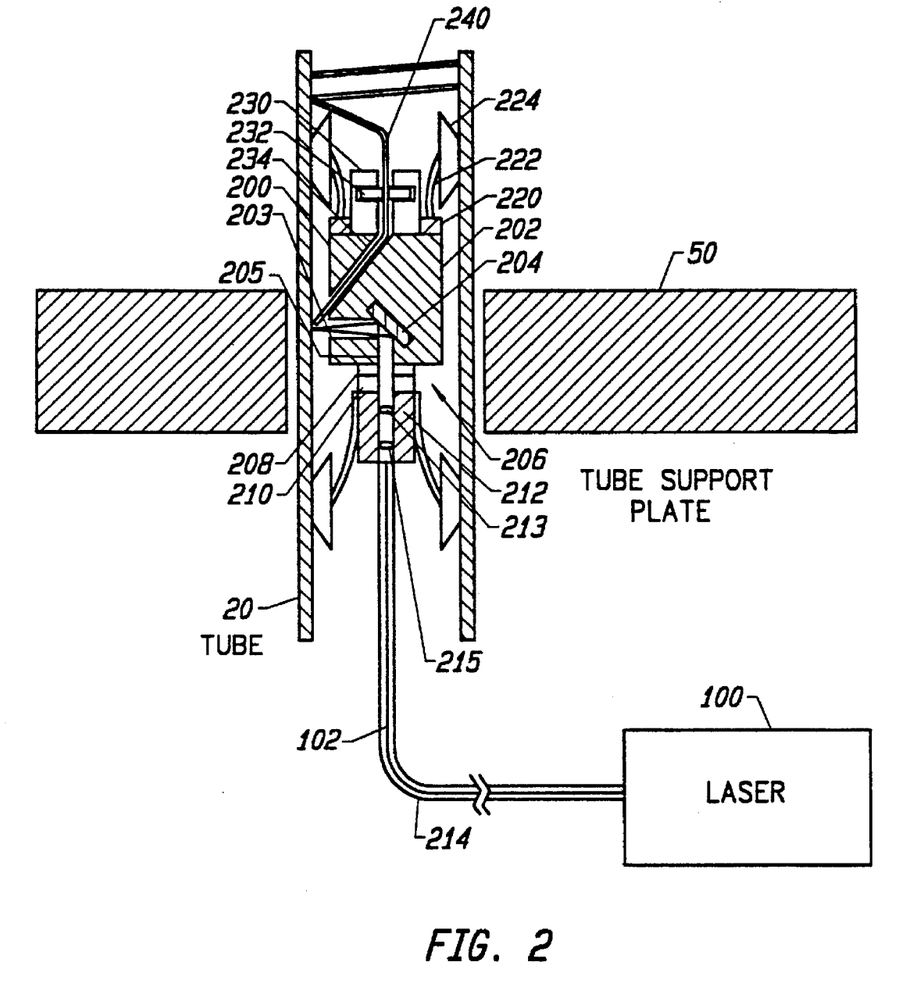
FIG. 2 is a cross-sectional view of one embodiment of the laser clad welding repair apparatus positioned within a steam generator tube and using a pre-positioned coil of wire as the filler metal.

Referring now to FIG. 2, a cross-sectional view of one embodiment of the laser clad welding repair apparatus is depicted. This Figure shows the overall installation and use of the invention to clad weld the interior of a small diameter tube. Illustrated is a portion of a steam generator tube 20 where it passes through a tube support plate 50. Typically the clearance between the exterior surface of tube 20 and the internal diameter of the aperture through the support plate 50 is one the order of 0.008 to 0.015 inches. Thus the potential for crevice corrosion is apparent. In this embodiment, the apparatus is positioned within a steam generator tube and uses a pre-positioned coil of wire as the filler metal.

Laser 100 is the heat source for welding the damaged tube 20. The laser 100 can be of any type commonly used for welding but more typically is an Nd:YAG laser. An example of such a laser which has been used by the inventors is a Hobart Laser Products model 2400 which produces 2400 watts of power. Laser 100 is connected to an optical fiber 102 which guides the laser power generated by the laser source 100 to the weld head 200.

Weld head 200 comprises a cylindrical rotary body 202. Housed within body 202 is mirror 204 which is oriented at a 45 degree angle to the axis of body 202. Two passage ways for laser beam light are bored in body 202. The first passageway 205 is concentric with the cylindrical axis of body 202 and enters from its lower surface and terminates at the surface of mirror 204. The second passageway 203 is bored radially from the circumference of body 202 and terminates again at the surface of mirror 204. In this manner, laser beam light entering the bottom of body 202 reflects off mirror 204 radially out to the interior surface of tube 20. Connected to the bottom of body 202 is a rotary joint 206. Rotary joint 206 comprises an upper, rotary portion 208 and a lower, stationary portion 210 and allows the body 202 of weld head 200 to rotate about its axis. Connected to stationary portion 210 of rotary joint 206 is rotating head drive motor 212. Drive motor 212 is a hollow shaft miniature electric or pneumatic motor which provides the rotary force necessary to turn body 202 during operation of the weld held 200. The bottom of motor 212 is connected to flexible cable 214 which connects to laser source 100 and contains optical fiber 102. Cable 214 also includes electrical wires (not shown) to power drive motor 212 if it is electric. In the case when a pneumatic motor is used to drive the weld head 200, cable 214 houses a pneumatic tube (not shown) to drive motor 212. In addition, cable 214 can include conduit (not shown) for the delivery of shielding gas such as argon or helium to improve the final weld as is commonly understood by those skilled in the welding arts.

Because motor 212 has a hollow shaft, laser energy can pass through motor 212 and rotary joint 206 to mirror 204. Mounted within the hollow shaft of motor 212 are focusing lenses 213 and 215. These lenses can adjust the focal length of the passageway so that the laser energy is concentrated on the interior surface of tube 20. Various methods known to those skilled in the art are available for adjusting the distance between lense 213 and lense 215 which allows the focal length to be adjusted so the same weld head 200 can be used in tubes of different internal diameters.

Mounted on the top of weld head body 202 is ring shaped bearing 220. Bearing 220 is rotably connected to body 202 to allow relative rotary motion. Connected to rotary bearing 220 and drive motor 212 are lead springs 222 which have shoes 224 mounted on their distal ends. Leaf springs 222 urge shoes 224 radially outward from the centerline axis of weld head 200. Shoes 224 engage the interior wall of tube 20 and function to hold weld head 200 centered in tube 200 while the weld head is operated. However, the relatively light friction between shoes 224 and tube 20 allow weld head 200 to be easily moved axially within the tube so that the weld head can be accurately positioned for a welding operation.

Also mounted on the top of weld head body 202 and within ring shaped bearing 220 is filler wire feed motor 230 of the type commonly used and well known in the art. Feed motor 230 has a hollow shaft and a plurality of friction wheels 232 which grip a wire and feed it linearly through the hollow shaft. The axis of rotation for friction wheels 232 is slightly offset from the axis of rotation of the welding head body 202. Therefore, as weld head body 202 is rotated, the friction wheels impart a linear motion to wire held between the tangentially engaging surfaces of the wheels. The hollow shaft of feed motor 230 terminates at the lower edge of motor 230 in alignment with filler wire guide 234. Filler wire 234 is a bored passageway through weld head body 202. The upper entrance to guide 234 is centered in the supper surface of body 202 and the lower exit of guide 234 is at the side of body 202 directly above the radial exit of laser beam passageway 205. In this manner, wire fed through guide 234 is directed to the location of welding. Above weld head 200 is depicted filler wire 240. Filler wire 240 is made of the same material as tube 20, generally Inconel® alloy 625, 52 or 72, and can include deoxidizing and viscosity control agents such as silicon and titanium. Filler wire 240 is preshaped into a coil having an exterior diameter which approximately coincides with the interior diameter of tube 20. Friction between coiled filler wire 240 and the interior surface of tube 20 holds the wire in place during operation of the weld head 200. The lower end of filler wire 240 passes through friction wheels 232 in wire feed motor 230 into guide 234 and out the side of body 202 at the location of the weld. Weld head 200 is positioned within tube 20 at the location of the repair. Weld head 200 redirects the laser energy from the optical fiber in a radial direction against the interior wall of tube 20.

The following describes the procedure and operation used to accomplish a tube repair with the present invention. First, filler wire 240 is coiled so that the outside diameter of the coil approximately matches the internal diameter of tube 20. The lower end of wire 240 is bent to the center of the coil and then bent downward so that the end will lie on the centerline of the tube 20 after the coil is inserted in the tube. The coil of filler wire is then inserted into the tube 20 and pushed to a position slightly above the intended weld repair. The coil can be moved in the tube without deforming its shape by using a flexible hollow hose of outside diameter slightly less than the internal diameter of tube 20. After the wire coil has been positioned, the weld head 200 is inserted into the tube 20, wire feed motor 230 first. Insertion of the weld head 200 is accomplished by compressing shoes 224 radially inward and then inserting the weld head 200 into tube 20. The weld head 200 is then pushed within the tube by manually feeding cable 214 into the tube 20 until weld head 200 is positioned at the location of the repair. When weld head 200 reaches the proper location, the end of filler wire 240 coil which was previously positioned, will feed into the center of wire feed motor 230 and be engaged by friction wheels 232. To commence welding, power, either electric or pneumatic, is applied to drive motor 212 which rotates weld head body 202. Rotation of the weld head body 202 causes wire feed motor 230 to feed wire 240 through wire guide 234 to the interior wall of tube 20. At the same time, the laser source 100 is turned on and laser energy is transmitted to the internal wall of tube 20 via optical fiber 102 and mirror 204. Weld head 200 can be simultaneously move axially within tube 20 by pulling on cable 214. Alternately, a precision thread connection, well known to those skilled in the art, between weld body 202 and ring bearing 220 can accomplish uniform axial advance of the weld head body 202 during the welding operation. Thus as weld head body 202 rotates, the base metal of tube 20 is melted while filler wire is fed to the location of the weld and melted simultaneously thereby producing a clad weld.

Figure 3:
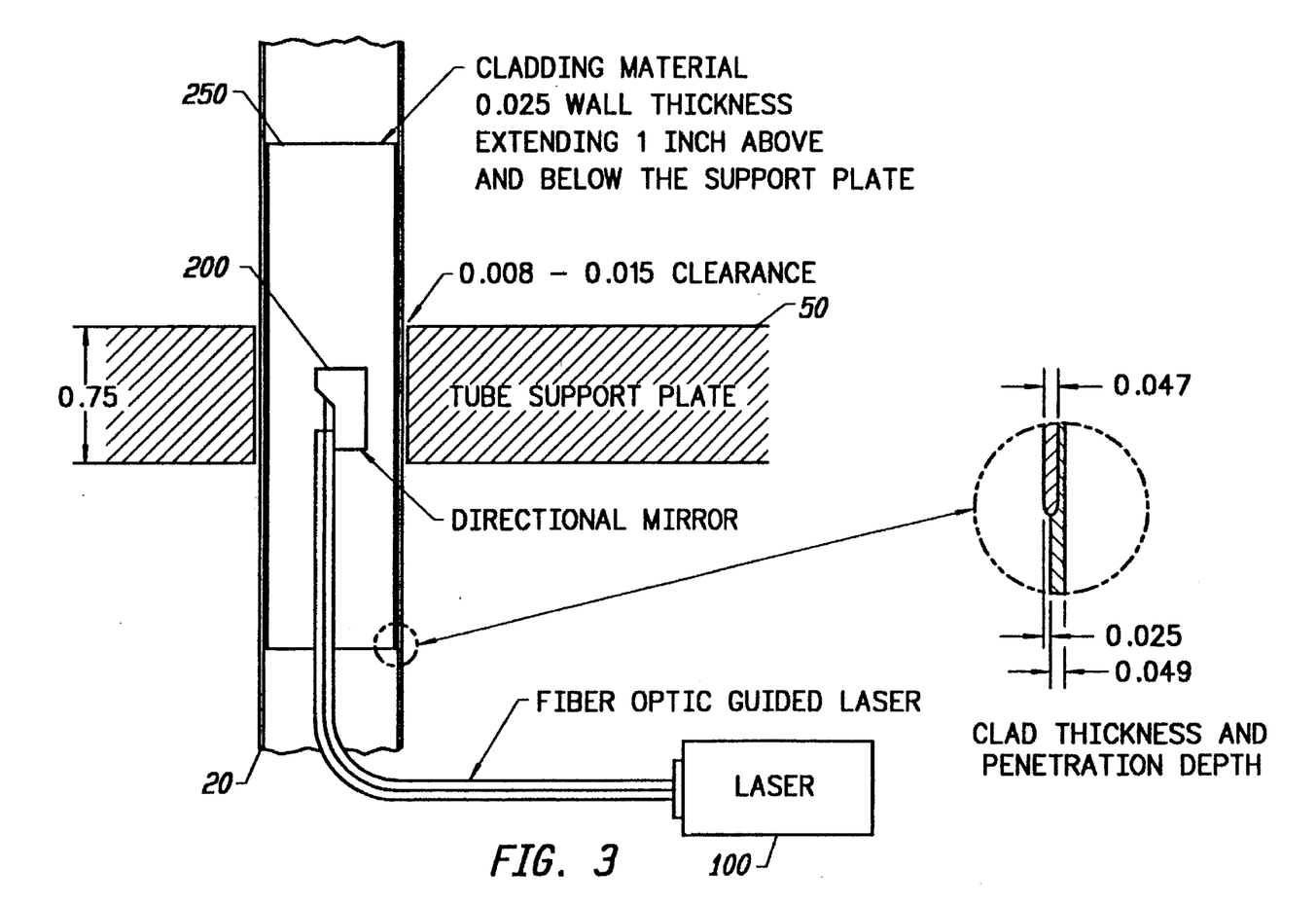
FIG. 3 is a simplified cross-sectional view of another embodiment of the laser clad welding apparatus positioned within a steam generator tube near a tube support plate and welding a pre-positioned thin sheet of filler metal to the interior of a tube.

Referring now to FIG. 3, a simplified cross-sectional view of another embodiment of a the laser clad welding apparatus is depicted. In this embodiment, a thin sheet 250 a weld filler material is used in lieu of the filler wire 240 previously described. The weld filler material used in the sheet can have deoxidizing and viscosity control agents are previously described for the filler wire 240. The sheet 250 of filler metal is approximately 0.025 inches thick and is bent into the form of a hollow cylinder having a length to coincide with the length of the tube section to be repaired. The external diameter of the cylinder thus formed is approximately equal to the internal diameter of tube 20 and therefore the cylinder can be pre-positioned in a manner similar to that previously described for the wire coil. After the cylinder is pre-positioned, the weld head 200 is inserted in the tube and the weld is accomplished in the same manner. The resulting weld yields a uniform cladding which decreases the internal weld diameter of the tube by only 0.050 inches. Penetration depth of the weld is approximately 0.022 inches resulting in a clad thickness of 0.047 inches and an excellent bond is effected between the thin sheet 250 and the tube 20.

Figure 4:
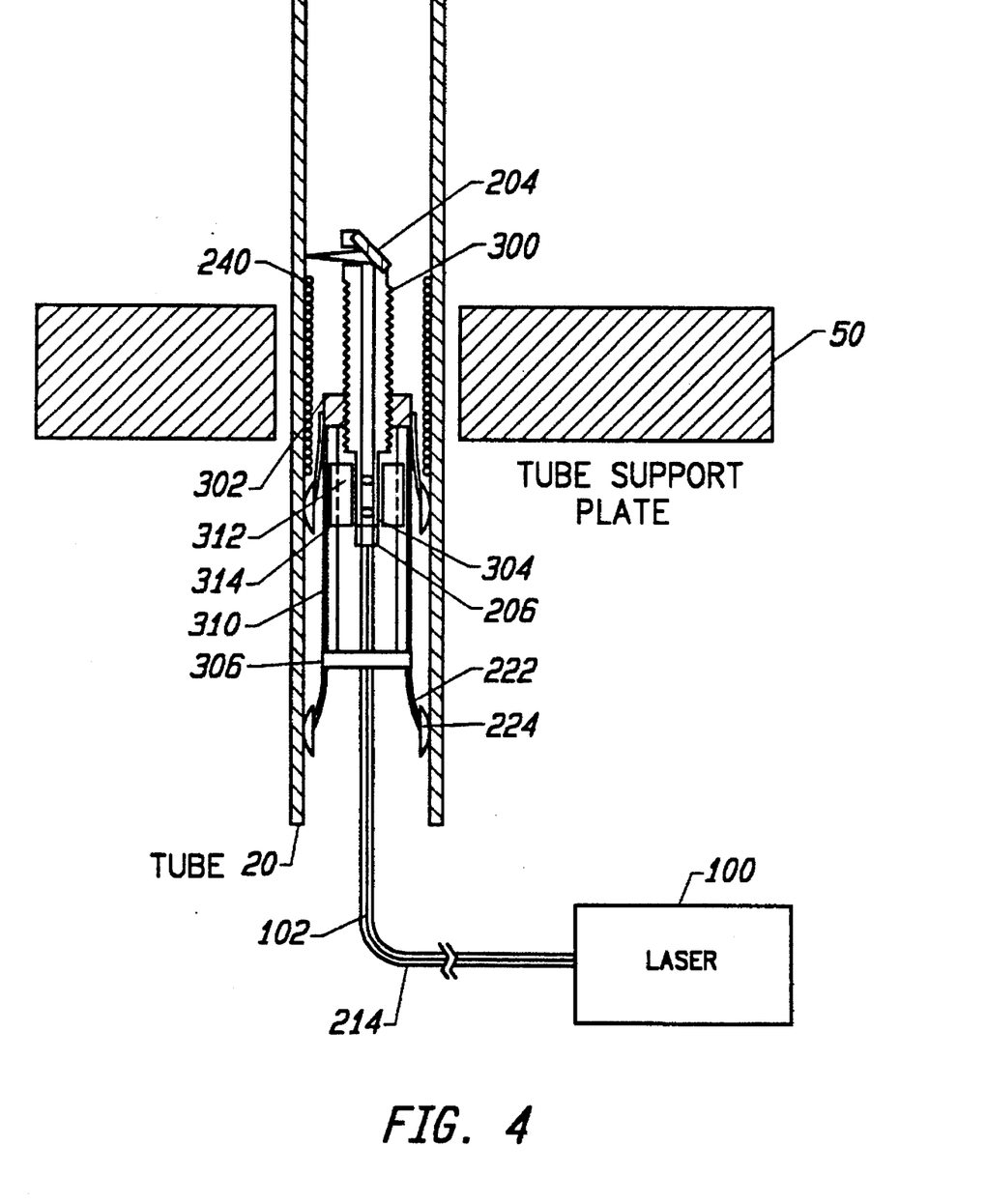
FIG. 4 is a cross-sectional view of an alternate embodiment of the laser clad welding repair apparatus positioned within a steam generator tube and using a coil of fill metal wire pre-positioned directly over the area to be clad welded.

Turning now to FIG. 4, a third embodiment of the present invention is depicted. FIG. 4 shows a simplified cross-sectional view of an alternate embodiment of the laser clad welding repair apparatus positioned within a steam generator tube and using a pre-positioned coil to fill metal wire directly over the area to be clad welded. In this embodiment, weld head 200 consists of a hollow, threaded rod 300 with mirror 204 mounted on top at a forth five (45) degree angle. Rod 300 screws into circular and internally threaded upper end plate 302. The lower end of rod 300 serves as the armature 304 for drive motor 212. Upper end plate 302 is connected to a washer shaped lower end plate 306 by guide rods 310. Lower and upper end plates 306, 302 are held in position within tube 20 by leaf springs 222 and shoes 224. Guide rods 310 are "T" shaped in cross section and are positioned parallel to the axis of rod 300 with center flanges facing radially inward toward the center of the weld head apparatus 200. The stator 312 of motor 212 has longitudinal grooves 314 on each side which accept the edges of guide rods 310. The bottom of motor armature 304 is attached to rotary joint 206 which in turn is attached to cable 214.

In operation, a tightly wound coil of filler wire 240 is prepositioned within tube 20 directly over the area to be clad welded. Weld head 200 is then inserted in the tube so that mirror 204 is slightly above the top of wire 240. When laser energy is supplied to the weld head 200 and motor 212 is energized, rod 300 and mirror 204 rotate directing laser energy onto the coil of wire 240. In addition, rod 300 threads into upper plate 302 causing the weld beam to travel axially downward through coiled wire 240 at a rate which is synchronized with its rotary motion. To accommodate the axial movement of rod 300, motor stator 312 slides along guide rods 310 but is prevented from rotating by grooves 314 which are engaged with the edges of guide rods 310. Thus the laser beam rotates and travels axially within the tube flushing wire 240 to the interior surface of tube 20 producing a uniform cad weld.

Figure 5:
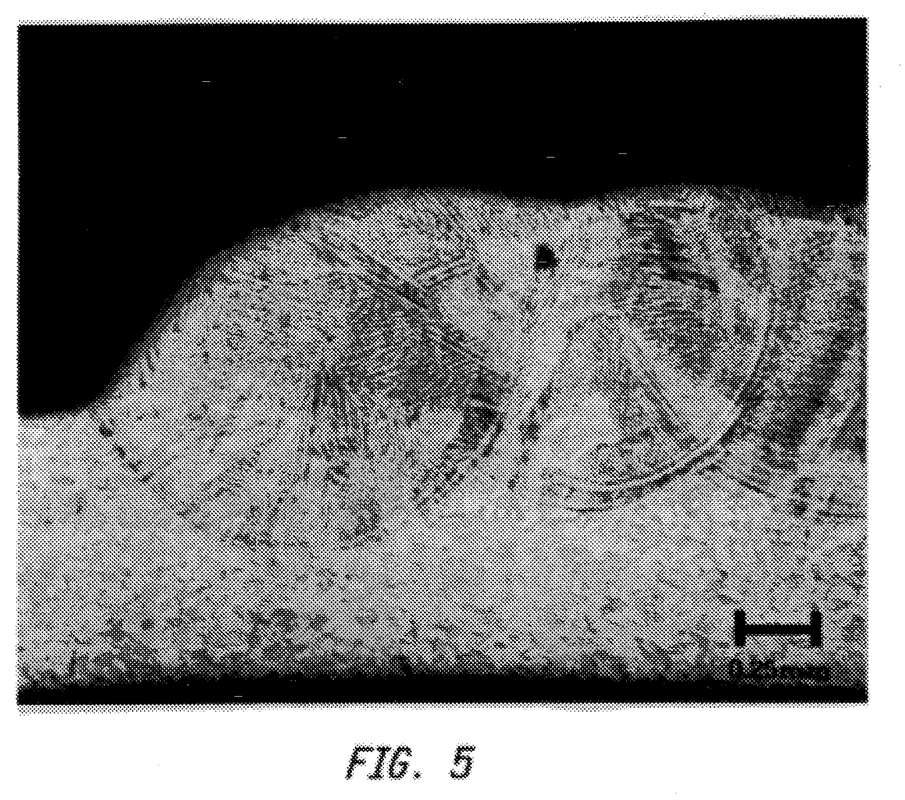
FIG. 5 is a photograph of a demonstration weld produced by a prototype of the present invention.

Referring now to FIG. 5, depicted is a photograph of a demonstration weld produced by a prototype of the present invention. A prototype welder of the type herein described was assembled using the Hobar Model 2400 laser described above. The weld was performed on the exterior of an Inconel® alloy 600 tube similar to those used in steam generators. It was decided to perform an exterior weld on the tube to simplify both inspection during the welding operation and the optimization of wire feed rates and welding head advance rates. To control welding head advance, the tube was mounted in a lathe chuck and the welding head was mounted on the lathe tool holder. During welding operation, the tube was turned at 85 RPM and the weld head was advanced at a rate of 6 inches per minute along the axis of the tube. The resulting surface speed of the weld was 200 inches per minute and the filler wire advance rate was set to approximately match the surface speed. Inspection of the photograph in FIG. 5 shows an excellent weld without voids or inclusions. The cladding resulting from this weld was uniform in thickness and penetration and showed no cracks or crevices which would promote corrosion when the tube is put in service.

Having thus described exemplary, embodiments of the invention, it is recognized that those skilled in the art will be able to envision and design changes and modifications in the implementation of this invention without departing from the scope and spirit of the invention now claimed:

We claim:

1. A method of clad welding the interior surface of a vertically oriented stationary tube, comprising the steps of:

feeding wire filler metal to a clad weld location within said interior surface of said vertically oriented stationary tube; and directing laser energy through a fiber optic cable to said clad weld location so that said laser energy and said wire filler metal intersect and fuse to produce a clad weld of said vertically oriented stationary tube.

2. The method of claim 1 wherein said directing step includes the step of directing laser energy from a Nd:YAG laser.

3. A method of clad welding the interior surface of a stationary tube, comprising the steps of:

pre-positioning a coil of filler metal adjacent to a weld location within said interior surface of said stationary tube;

delivering said coil of filler metal to said weld location; and directing laser energy through a fiber optic cable to said weld location, thereby fusing said filler metal to produce a clad weld of said stationary tube.

4. A laser welding apparatus for clad welding the interior surface of a vertically oriented stationary tube, comprising:

a laser energy source producing laser energy;

an optical fiber having a first end and a second end, said first end connected to said laser energy source for receiving said laser energy;

a rotary weld head for receiving said laser energy from said second end of said optical fiber and for directing said laser energy to a clad weld location on the interior surface of said vertically oriented stationary tube, said rotary weld head including a laser energy redirection device positioned on the rotary axis of said rotary weld head;

a first passage through said rotary weld head concentric with the axis of rotation of said rotary weld head and in straight line communication with said second end of said optical fiber for communicating said laser energy to said laser energy redirection device, and a second passage through said rotary weld head radially outward from said laser energy redirection device for communicating said laser energy to said clad weld location;

means for delivering wire filler metal to said clad weld location so that it intersects with said laser energy to produce a clad weld; and means for holding said rotary weld head in position within said stationary tube.

5. The laser welding apparatus of claim 4 wherein said delivering means comprises:

a linear wire feed motor mounted on said rotary weld head to accept and discharge a coil of wire filler metal pre-positioned within said tube at a location near said weld; and a wire feed guide passage through said rotary weld head for accepting the end of said wire as it is discharged from said linear wire feed motor and directing said wire toward the location of said weld.

6. A laser welding apparatus for clad welding the interior surface of a vertically oriented stationary tube, comprising:

a laser energy source producing laser energy;

an optical fiber having a first end and a second end, said first end connected to said laser energy source for receiving said laser energy;

means, connected to said second end of said optical fiber, for directing said laser energy received at said second end of said optical fiber to a clad weld location at the interior surface of said vertically oriented stationary tube; and means for delivering wire filler metal to said clad weld location such that said laser energy and said wire filler metal intersect to produce a clad weld at said clad weld location.

7. The laser welding apparatus of claim 6 wherein said directing means includes:

a rotary weld head for receiving said laser energy from said second end of said optical fiber and for directing said laser energy to said clad weld location, said rotary weld head including a laser energy redirection device positioned on the rotary axis of said rotary weld head, a first passage through said rotary weld head concentric with the axis of rotation of said rotary weld head and in straight line communication with said second end of said optical fiber for communicating said laser energy to said laser energy redirection device, and a second passage through said rotary weld head radially outward from said laser energy redirection device for communicating said laser energy to said clad weld location.

8. The laser welding apparatus of claim 7 wherein said directing means includes means for holding said rotary weld head in position within said stationary tube.

9. The laser welding apparatus of claim 7 wherein said laser energy redirection device is a mirror.

10. The laser welding apparatus of claim 7 wherein said directing means further comprises:

a linear wire feed motor mounted on said rotary weld head to accept and discharge a coil of wire filler metal pre-positioned within said tube at a location proximate to said clad weld location; and a wire feed guide passage through said rotary weld head for accepting the end of said wire as it is discharged from said linear wire feed motor and directing said wire toward said clad weld location.

11. The laser welding apparatus of claim 6 wherein said delivery means includes a coil of wire filler metal positioned above said clad weld location.

* * * * *